US005332330A

United States Patent [19]

Kaneko

[11] Patent Number: 5,332,330

[45] Date of Patent: Jul. 26, 1994

[54] CONNECTOR

[75] Inventor: Tetsuya Kaneko, Tokyo, Japan

[73] Assignee: Yamaichi Electric Co., Ltd., Tokyo, Japan

[21] Appl. No.: 93,990

[22] Filed: Jul. 21, 1993

Related U.S. Application Data

[63] Continuation of Ser. No. 769,643, Oct. 1, 1991, abandoned.

[30] Foreign Application Priority Data

Oct. 2, 1990 [JP] Japan .................................. 2-264773

[51] Int. Cl.⁵ ................................................ F16B 1/04

[52] U.S. Cl. .......................................... 403/321; 403/330; 403/326; 439/357

[58] Field of Search ............... 403/330, 321, 326, 322, 403/24, 323, 324; 439/350-353, 357, 358; 292/128, 101

[56] References Cited

U.S. PATENT DOCUMENTS

| | | | |
|---|---|---|---|
| 3,760,333 | 9/1973 | Stieler | 292/101 X |
| 4,530,615 | 7/1985 | Katsuura et al. | 403/321 X |
| 4,893,850 | 1/1990 | Mizusawa | 292/128 |
| 5,044,810 | 9/1991 | Matsuoka et al. | 403/330 X |
| 5,104,330 | 4/1992 | Yagi et al. | 439/353 X |

FOREIGN PATENT DOCUMENTS

| | | | |
|---|---|---|---|
| 2912740 | 10/1975 | Fed. Rep. of Germany | 439/350 |
| 2850440 | 5/1979 | Fed. Rep. of Germany | 439/350 |
| 2889278 | 3/1978 | Japan | 439/350 |
| 292587 | 11/1988 | Japan | 409/350 |
| 12476 | 1/1989 | Japan | 439/350 |
| 2-192678 | 7/1990 | Japan . | |
| 2082401 | 3/1982 | United Kingdom | 439/350 |
| 2166300 | 4/1986 | United Kingdom | 439/350 |

*Primary Examiner*—Randolph A. Reese
*Assistant Examiner*—Harry C. Kim
*Attorney, Agent, or Firm*—Wenderoth, Lind & Ponack

[57] ABSTRACT

A connector has a first connector member and a second connector member. The first connector has a pair of left and right shutter members at its left and right side ends. Each of the left and right shutter members has an eject portion which presses the second connector to separate the first and second connectors in accordance with a pivotal movement of the shutter member. The eject portion has a pair of connector press portions which are exposedly projected along front and rear outer surfaces of the first connector. The connector press portion is able to press front and rear outer edge portions of a surface of the connector opposite the first connector.

2 Claims, 5 Drawing Sheets

CONNECTOR

This application is a continuation of now abandoned application, Ser. No. 07/769,643, filed Oct. 1, 1991.

BACKGROUND OF THE INVENTION

1. Field of the Invention

This invention relates to a lock and eject mechanism for a pair of connectors to be connected.

2. Brief Description of the Prior Art

In a conventional connector as disclosed in, for example, Japanese Patent Early Laid-open Publication No. Hei 2-192678, a first connector is provided at its left and right ends (ends of arrangement of contacts) with a pair of pivotable latches. Each of the latches is integrally provided with an eject portion and a lock portion for ejecting and locking a second connector spaced in the vertical direction. The eject portion is arranged in such a manner as to project between a left and right end face and an inner surface of the pivotable latch, so that it can press a pressure bearing portion of the second connector disposed in generally the same position. Also, the lock portion is integrally formed with the pivotable latch itself as described above, and its engagement with the second connector is maintained by a spring adapted to resiliently hold the pivotable latch.

However, since the pivotable latch has the eject portion and the lock portion juxtaposed at a predetermined space in the vertical direction, and the eject portion is disposed in such a manner as to act on the second connector between the opposing surfaces of the second connector and the pivotable latch, the first connector inevitably becomes long in the direction of arrangement of contacts due to the space occupied by the eject mechanism. As a result, the connector is difficult to make smaller in view of its structure. If the distance from the fulcrum of the pivotable latch of the eject portion is made short in order to make the connector smaller, there arise the problems that a large force is required based on the principle of levers, and operability is deteriorated. On the contrary, if the distance from the fulcrum of the pivotable latch is made long, a large size connector results. In the conventional connector, it is difficult to solve the above two problems at the same time.

Further, in the conventional connector, since the eject portion and the lock portion are integrally formed spaced in the vertical direction on the pivotable latch, and the eject portion and the lock portion are in cooperation by means of the provision of the pressure bearing portion and the retaining portion of the second connector, the connector inevitably becomes bulky as a result of the long above-mentioned distance.

Furthermore, the conventional connector has the problems that since the eject portion and the lock portion are integrally formed with the pivotable latch, the installation distance between the eject portion and the lock portion is normally fixed. As a result, when the eject portion is moved, the relative position of the lock portion is also moved. As a result, the pivotable latch is difficult to are compatible and the design of the contact is restricted.

SUMMARY OF THE INVENTION

It is therefore a general object of the present invention to provide a connector which does not have the above-described problems.

In the present invention, as means for solving the above-mentioned problems, a first connector is provided at left and right side portions thereof with a pair of left and right shutter members each including only an eject portion, pivotably mounted thereon. In addition, the first connector is separately provided at left and right side portions thereof with a pair of left and right latches adapted to lock the first connector and a second connector. Each of the shutter members is provided with a latch press portion which is pivoted about its fulcrum to press the latch to eliminate a locking state between the first and second connectors. The latch actuated by the shutter member and the eject portion cooperate with each other in order to separate the first and second connectors.

Also, in the present invention, the eject portions of the pair of shutter members are provided with a pair of press portions exposedly extending along the front and rear side surfaces of the second connector. The press portions are arranged such that they press the front and rear outer edge portions of the second connector, opposing the first connector, to thereby separate the first and second connectors.

In the construction of the present invention, the ejector portions do not occupy spaces between the left and right side end faces of the first connector and the inner surfaces of the left and right shutter members. The press portions forming the eject portions project along the front and rear outer surfaces of the first connector are operated to press the front and rear outer edge portions of the second connector corresponding thereto in order to separate the first and second connectors. Accordingly, the left and right shutter members can be located proximate to the left and right side end faces of the first connector. Since the spaces occupied by the eject portions in the conventional connector can be eliminated, the length of the connector can be made short in the direction of arrangement of contacts and thus, the connector can be made small. Further, since the press portion forming the eject portion can be made long from the fulcrum of each of the pivotable shutter members without the restriction as required in the prior art, the press portion can be made sufficiently long so that an ejecting operation can be made with reduced force. In other words, even if the press portion is made long in order to enhance operability, a large size connector does not result.

By the above-described arrangement, there can be provided a connector which satisfies both the requirements for enhancing the operability of this type of lock and eject mechanism and for making the connector small in size.

Also, the left and right shutter members of the present invention include only the eject portion. In addition, each of the shutter members includes the latch for locking the first and second connectors, and by pressing the latch against the latch press portion formed on each shutter member, the lock state can be eliminated. By virtue of the foregoing arrangement, the eject portions can be located without any restriction as to the positions of the latch retaining claws as lock means. Accordingly, the connector can be designed such that the eject portions and the retaining claws of the latches are located without spaces therebetween, and the eject portions and the retaining claws acting on the pressure receiving portions and the engaging portions of the second connector are arranged in such a manner as to be closer to each other or at the same level. As a result, the lock and eject means can be made small in size, and thus, the connector can be greatly reduced in bulk. Moreover, the latch retaining claws and the eject portions of the shutter members are not limited to one. Therefore, upon a change in design specifications of the second connector, the distance can properly be established by changing the positions where the others are located.

Other objects and features of the present invention will become apparent upon a reading of the following detailed description of the embodiment with reference to the accompanying drawings.

DETAILED DESCRIPTION OF THE EMBODIMENT

Figure 1:
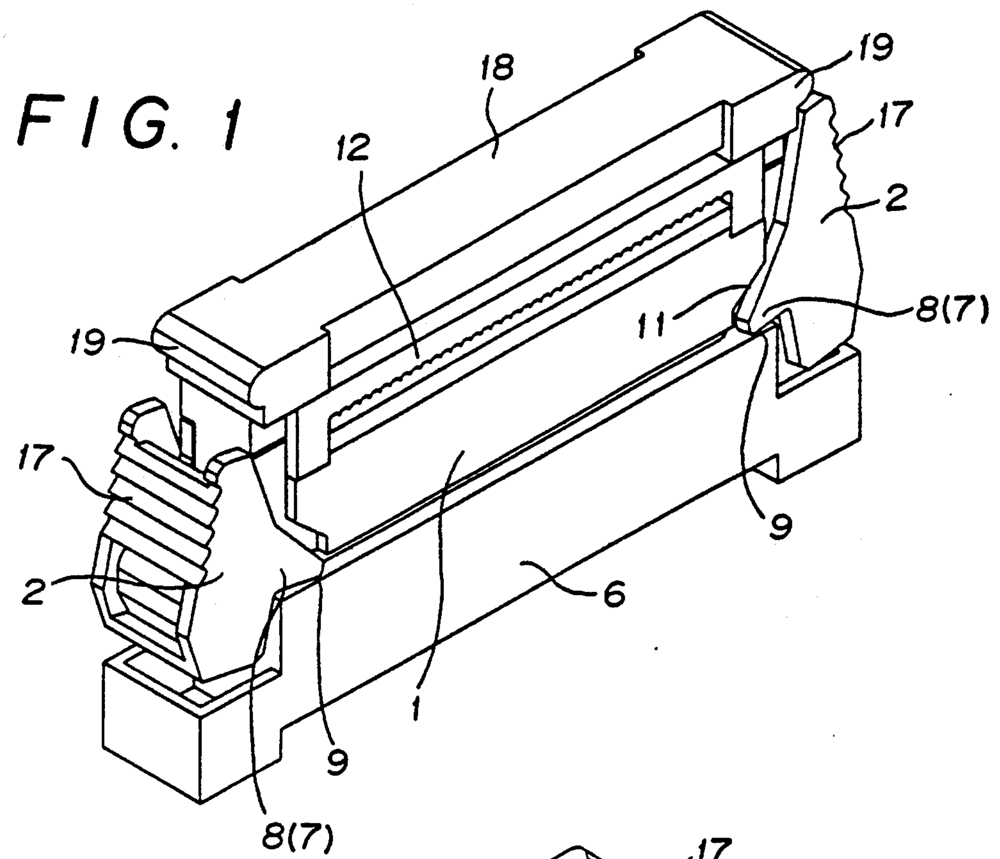
FIG. 1 is a perspective view of a connector according to one embodiment of the present invention, in which shutter members of the first and second members are separated by a pivotal movement of the shutter members.
Figure 3:
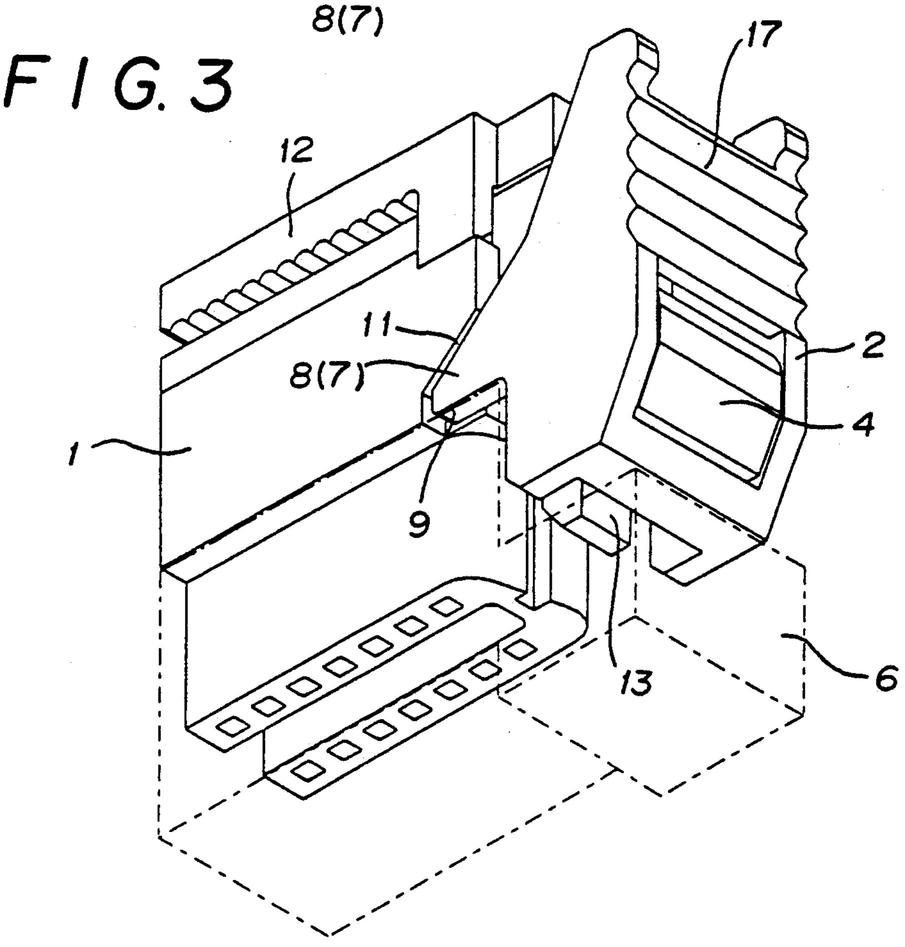
FIG. 3 is a perspective view showing a locked state of the first and second connectors.
Figure 2:
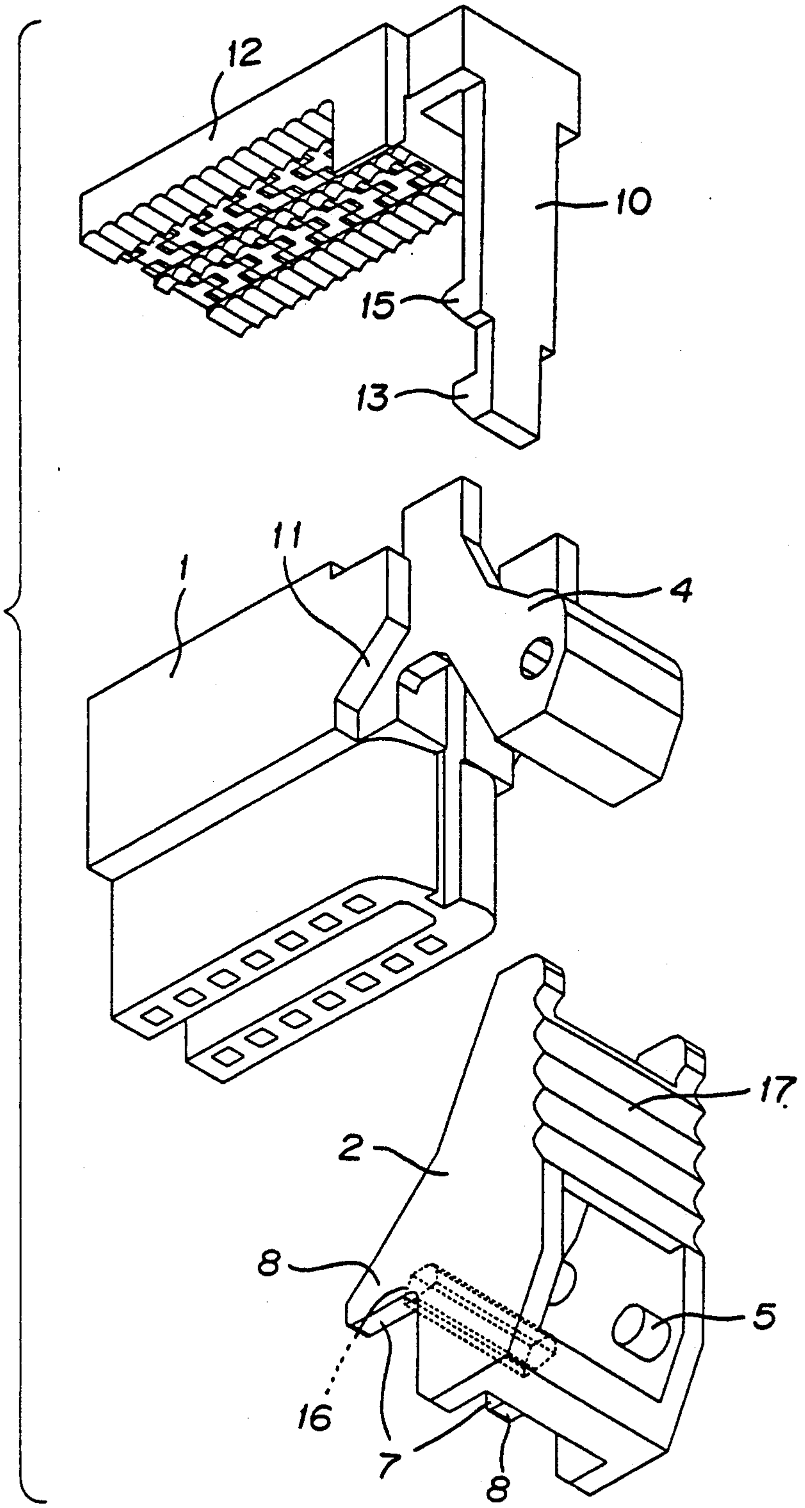
FIG. 2 is an exploded perspective view of the connector of FIG. 1.
Figure 4:
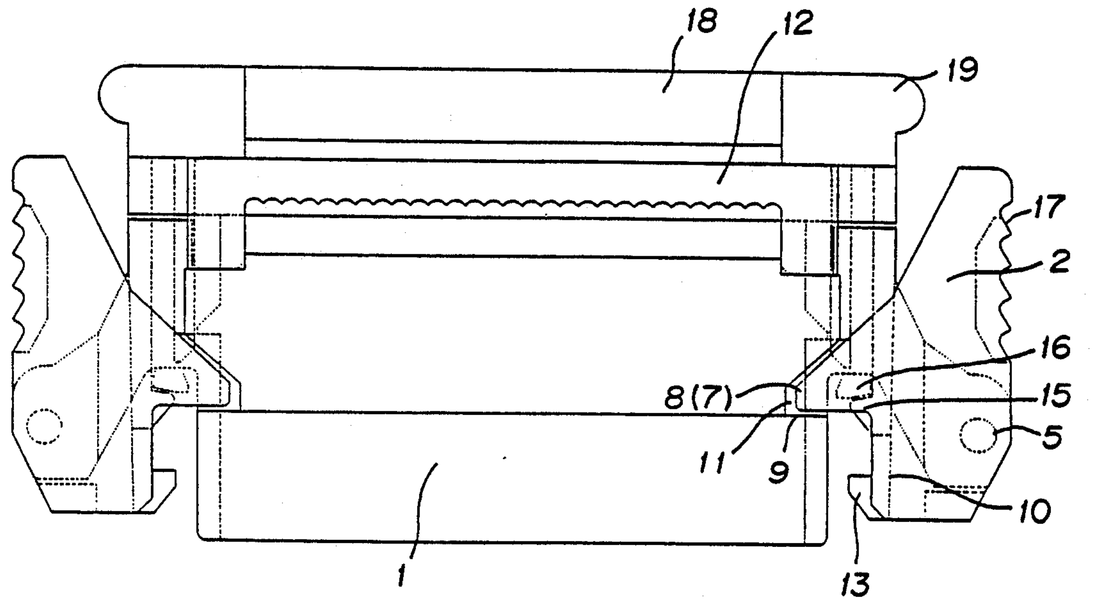
FIG. 4 is a side view of the connector of FIG. 1 when viewed from the front and rear direction of the first connector.
Figure 5:
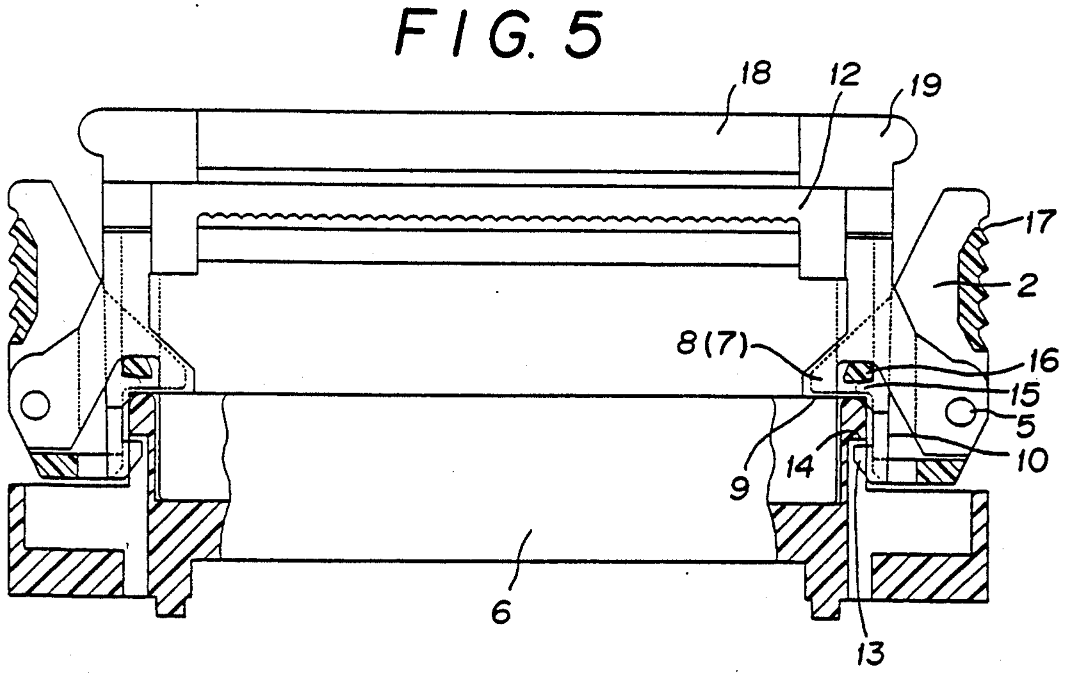
FIG. 5 is a side view, partly cut-away, of the locked state of the first and second connectors when viewed from the front and rear direction.

One embodiment of the present invention will be described in detail with reference to FIGS. 1 through 9 of the accompanying drawings.

The numeral 1 denotes a first connector, which is provided with a pair of shutter members pivotably mounted on left and right side end portions thereof. The first connector 1 has a joint 4 projecting from each of the left and right side faces. The shutter members 2 have side portions extending in such a manner as to sandwich the joints 4 therebetween. The shutter members 2 are pivotably supported by shafts 5 forming pivot fulcrums. The numeral 6 denotes a second connector to be connected with the first connector 1. The first connector 1 is, for example, a flat cable connecting connector, and the second connector 6 is a connector mounted to a wiring board or the like.

Each shutter member 2 has an operating portion 17 extending along the left and right side face of the first connector from the pivot fulcrum, and also a separator portion 7, which presses the second connector 6 to separate the first and second connectors 1 and 6 upon an inward pivotal movement of the operating portion 17 of the shutter member 2. The separator portion 7 has a pair of connector press portions 8 exposedly projecting along the front and rear outer surfaces of the first connector from the pivot fulcrum of each shutter member 2, and the connector portion 8 presses front and rear outer edge portions of that surface of the second connector 6 opposite the first connector 1. Accordingly, the front and rear outer edge portions parallel with the row of contacts of the first connector 1 form pressure bearing portions 9 to be pressed by the connector press portion 8. The relation between the connector press portions 8 and the pressure bearing portions 9 can be visually recognized easily.

When the left and right shutter members 2 are pivoted inward, the press portions 8 press the pressure bearing portions 9 of the second connector 6 to separate the first and second connectors 1 and 6. The term "separate" refers to not only a state where the first and second connectors are completely separated from each other but also to a state where the first and second connectors 1 and 6 are half-separated.

The first connector 1 is provided with cut-outs 11 formed in its front and rear outer surfaces respectively and having the press portions 8 projecting thereinto. Each cut 11 accommodates therein the connector press portion 8 in such a manner as to be opposite the pressure bearing portion 9 of the second connector 6. The press portion 8 is pivoted toward the pressure bearing portion 9 from the interior of the cut-out 11. Further, the first connector is provided with a pair of latches 10 disposed on left and right side portions of the first connector 1 and adapted to lock the first and second connectors 1 and 6 together. Where the first connector 1 is a flat cable connecting connector, the first connector 1 includes a cable presser 12 for attaching the flat cable under pressure. The latches 10 are extended from both left and right sides of the cable presser 12 along the left and right side is faces of the first connector 1 and each is provided with a retaining claw 13 at its distal end. Accordingly, the left and right latches 10 extend into the interiors of the left and right shutter members 2 at the inner side of each fulcrum. The retaining claws 13 are engaged with and disengaged from the engaging portions 14 disposed at the left and right side portions of the second connector 6. The engagements between the retaining claws 13 and the engaging portions 14 are maintained by the resiliency of the latches 10.

Although not illustrated, the present invention includes latches 10 extending from the left and right side faces of the second connector along the left and right side faces of the first connector 1, so that the latches 10 may be brought into engagement with the first connector 1 to lock the first and second connectors 1 and 6. Also, the connector may be designed such that the cable presser 12 forms a part of the first connector 1 and the latches 10 are extended from the body of the first connector 1 instead of being extended from the cable presser 12.

Each left and right shutter member 2 has an eject portion 16 spaced inward from its pivot fulcrum. When the operating portion 17 of the shutter member 2 is pivoted inward, the eject portion 16 presses a pressure bearing portion 15 integral with an inner surface of the latch 10 to elastically displace the latch 10 outward to release the lock state between the retaining claw 13 and the engaging portion 14 of the second connector 6.

Various relations between the eject portion 16 and the pressure bearing portion 15, between the latch eject portion 16 and the connector press portions 8 forming the separator portions 7 of the left and right shutter members 2, and between the retaining claw 13 of the latch 10 and the engaging portion 14 of the second connector 6 will be described with reference to FIGS. 6 and 9. As is shown FIG. 6, in when the retaining claw 13 of the latch 10 is in engagement with the engaging portion 14 of the second connector 6, and the first and second connectors 1 and 6 are in the locked state, the latch pressure bearing portion 15 is in engagement with the lower surface of the eject portion 16 in order to prevent the shutter member 2 accidentally pivoting inward to maintain the above-mentioned lock state.

Figure 6:
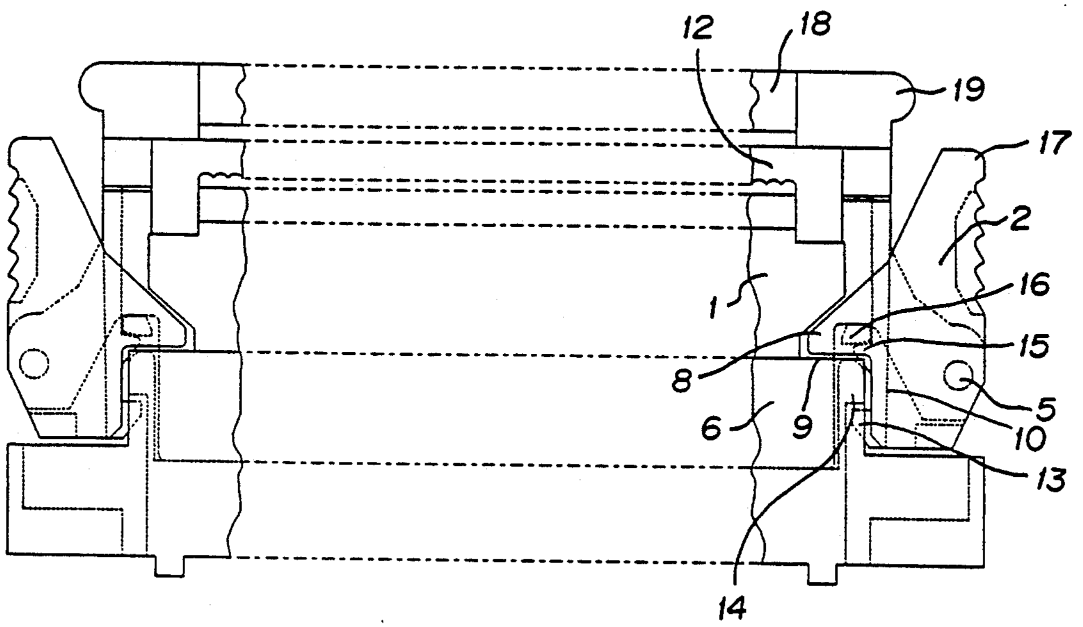
FIGS. 6 through 9 are side views similar to FIG. 4, showing various states of operation during the pivotal movements of the left and right shutter members.
Figure 7:
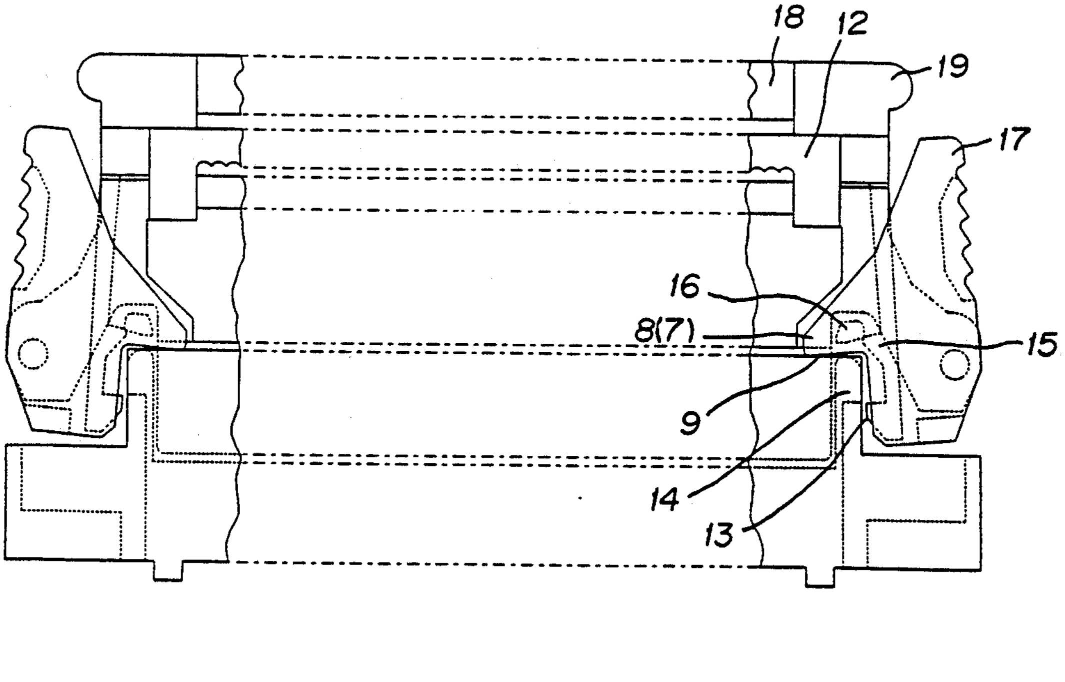
Figure 8:
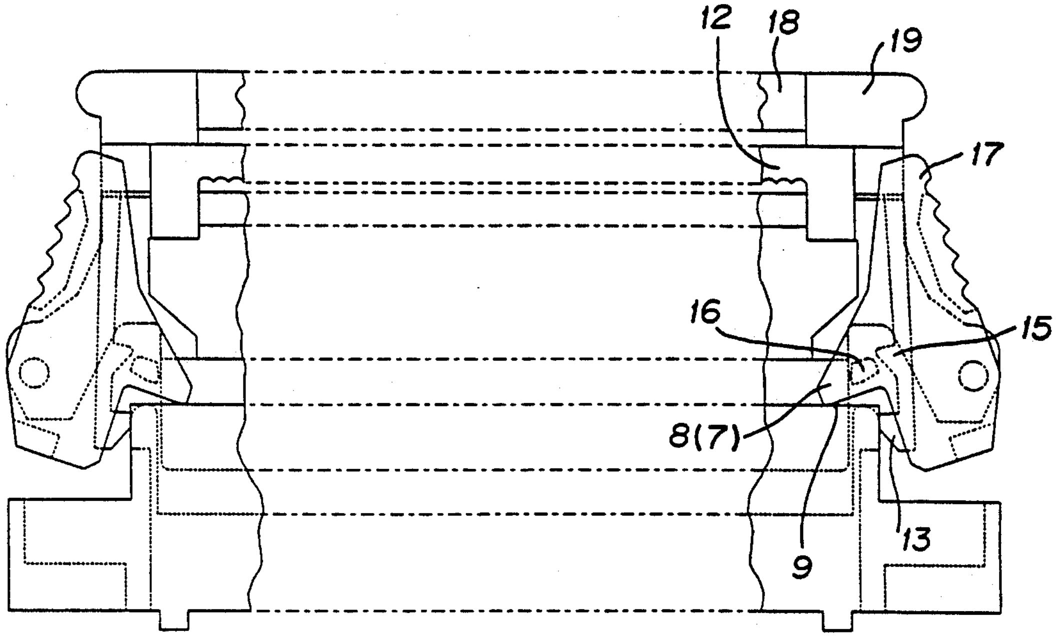
Figure 9:
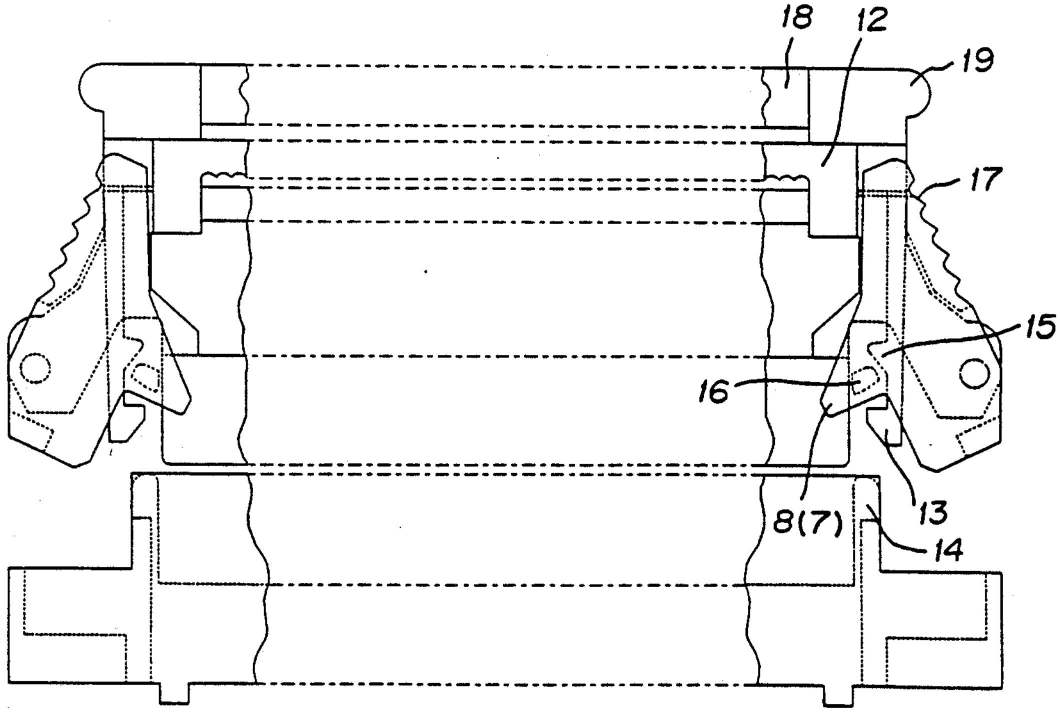

When each left and right shutter member 2 is pivoted inward from the state shown in FIG. 6, the eject portion 16, as shown in FIGS. 7, 8 and 9, is pivoted to climb over the pressure bearing portion 15 toward the lower surface side of the pressure bearing portion 15, while pressing the latch pressure bearing portion 15 outward. As a result, the engagement between the retaining claw 13 of the latch 10 and the engaging portion 14 of the second connector 6 is released, and at the same time, the connector press portion 8 presses the pressure bearing portion 9 of the second connector 6 to separate the first and second connectors 1 and 6 in accordance with the inward pivotal movement of the left and right shutter members 2.

When the first connector 1 is inserted into the second connector, a reverse procedure takes place as shown in FIG. 9 to FIG. 6, and the first and second connectors are locked. That is, when the first connector 1 is pushed into the second connector 6, a head portion of the engaging portion 14 presses a head portion of the retaining claw 13 at the distal end of the latch 10 to maintain an engaging state while displacing the retaining claw 13 outward. At this time, the latch pressure bearing portion 15 climbs over the eject portion 16 from its higher side toward its lower side. As a result, the eject 16 is restored inwardly to realize the engaging state between the engaging portion 14 and the retaining claw 13, i.e., the locked state between the first and second connectors 1 and 6 (see FIG. 6).

In FIGS. 6 through 9, the numeral 18 denotes a cable holder for holding the flat cable between the cable presser 12 and itself after an extra length portion of the flat cable pressure pressure-attached to the first connector 1 is folded back by the cable presser 12. The cable holder 18 has a finger stop portion 19 projecting from the left and right end portion thereof, so that the first connector 1 can be taken out while ejecting the same by operating the operating portion 17 of the left and right shutter member 2 inward. The present invention includes an embodiment in which the connector press portion 8 having the separator portion 7 is provided on the left and right shutter member in the foregoing arrangement, as well as another embodiment in which the eject portion 16 of the left and right shutter member presses the latch 10 which is separately provided, to thereby end the locked state.

As described in the foregoing, according to the present invention, while maintaining the arrangement of the left and right shutter members proximate to the left and right side faces of the first connector, the press portions forming the eject portions can be projected along the front and rear outer surfaces of the first connector. Accordingly, since the spaces occupied by the eject portions at the left and right side end faces of the conventional connector can be eliminated, the length in the direction of arrangement of contacts can be made short and as a result, the connector can be made small. In addition, the press portion having the separator portion can extend a distance from the respective pivot fulcrums of the shutter members along the front and rear side surfaces of the first connector without being restricted as in the conventional connector, and the press portion can be made sufficiently long to enable the separating operation to be carried out with reduced force. In other words, a large size connector does not result even if the press portion is made long for the purpose of enhancing operability. Because of the foregoing arrangement, there can be provided a connector, in which both the requirements for enhancing operability and making its size small in this kind of lock and eject mechanism are satisfied.

Furthermore, the left and right shutter members of a contact according to the present invention include only an eject portion, and in addition, they separately include a latch for locking the first and second connectors. The latch portion is pressed by the eject portion formed on the shutter member in order to end the locked state. Accordingly, the separator portion can be freely located without being limited by the position of the latch retaining claw. Without the requirement that the separator portion and the retaining claw of the latch be located with a space as in the conventional connector, the separator portion and the retaining claw can be located closer to each other or on the same level for the purpose of acting on the pressure bearing portion and the engaging portion of the second connector. As a result, the lock and eject mechanism can be made small, and therefore, the connector can be greatly reduced in bulk.

Moreover, the latch retaining claw and the separator portion of the shutter member are not limited to the arrangement shown. By properly setting the distance by changing the location of the other, the design of the connector can be freely changed if there is a change in design specifications of the second connector. Further, according to the present invention, the operating state of the separator portion can be visually recognized from outside easily. Accordingly, the locked or unlocked state of the latch can also be recognized in a proper manner.

It is understood that the invention is not limited to the details mentioned above, but may be modified within the scope of the appended claims.

What is claimed is:

1. A connector comprising:

a first connector member having opposite end portions;

a second connector member movably engageable with and disengageable from said first connector member by movement toward and away from said first connector member;

a pair of latch members mounted on said first connector member, one at each of said opposite end portions of said first connector member and each latch member having a latching projection thereon and a pressure bearing portion thereon and normally being resiliently urged toward said connector members and being movable away from said connector members;

said second connector member having latch recesses therein in which corresponding latching projections are engaged when said latch members are urged toward said connector members for holding said connector members in a locked condition; and a pair of shutter members, one pivotally mounted on said first connector member at each opposite end portion and each having an end movable toward and away from said first connector member when the shutter member is pivoted, and each having an eject portion engageable with said pressure bearing portion when said shutter members are pivoted toward said one connector member for urging said latch members away from said connector members for disengaging said latching projections from said latch recesses to free said first and second connector members for separation from each other.

2. A connector comprising:

a first connector member having opposite end portions;

a second connector member movably engageable with and disengageable from said first connector member by movement toward and away from said first connector member and having edge portions thereon adjacent said first connector member when said first and second connector members are engaged;

a pair of latch members, one mounted at each of said opposite end portions of said first connector member and each having a latching projection thereon and a pressure bearing portion thereon and normally being resiliently urged toward said second connector member and being movable away from said second connector member;

said second connector member having latch recesses therein in which corresponding latching projections are engaged when said latch members are urged toward said connector members for holding said connector members in a locked condition; and a pair of shutter members, one pivotally mounted on said first connector member at each opposite end portion and each having an end movable toward and away from said first connector member when the shutter member is pivoted, and each having at least two connector press portions projecting along said edge portions of said second connector member when said first and second connector members are engaged, said press portions engaging and pressing said edge portions of said second connector member for urging said second connector member away from said first connector member upon pivotal movement of said ends of said shutter members toward said first connector member, said press portions being exposed to the outside of said connector on front and rear faces of said first connector member, whereby the engagement of said press portions with said edge portions and the separation of said connector member can be visually confirmed;

each shutter member further having an eject portion engageable with said pressure bearing portion when said shutter members are pivoted toward said one connector member for urging said latch members away from said connector members for disengaging said latching projections from said latch recesses to free said first and second connector members for separation from each other.

* * * * *